US008648973B2

(12) United States Patent
Chang

(10) Patent No.: US 8,648,973 B2
(45) Date of Patent: Feb. 11, 2014

(54) LIQUID CRYSTAL DISPLAY WITH REDUCED PARASITIC CAPACITANCE VARIATION

(75) Inventor: Jong-Woong Chang, Asan-si (KR)

(73) Assignee: Samsung Display Co., Ltd. (KR)

(*) Notice: Subject to any disclaimer, the term of this patent is extended or adjusted under 35 U.S.C. 154(b) by 101 days.

(21) Appl. No.: 13/275,188

(22) Filed: Oct. 17, 2011

(65) Prior Publication Data

US 2012/0147283 A1 Jun. 14, 2012

(30) Foreign Application Priority Data

Dec. 13, 2010 (KR) .......................... 10-2010-0127014

(51) Int. Cl.
*G02F 1/1343* (2006.01)
(52) U.S. Cl.
USPC ............................................... 349/39; 349/38
(58) Field of Classification Search
USPC ....................................................... 349/39, 111
See application file for complete search history.

(56) References Cited

U.S. PATENT DOCUMENTS

| 5,953,088 A * | 9/1999 | Hanazawa et al. ............. 349/110 |
| 7,554,630 B2 * | 6/2009 | Kwon et al. .................... 349/111 |
| 2006/0120160 A1 * | 6/2006 | Park et al. ................ 365/185.22 |
| 2010/0007811 A1 * | 1/2010 | Choi ............................... 349/43 |

* cited by examiner

*Primary Examiner* — Edward Glick
*Assistant Examiner* — Mark Teets
(74) *Attorney, Agent, or Firm* — Innovation Counsel LLP

(57) ABSTRACT

A liquid crystal display capable of operating with little parasitic capacitance variation is presented. The display includes a substrate, a gate line disposed on the substrate, a storage electrode line disposed on the substrate and having a main portion that extends parallel with the gate line, a data line crossing the gate line and the storage electrode line and including a source electrode, a drain electrode facing the source electrode; and a pixel electrode connected to the drain electrode, wherein the storage electrode line includes a plurality of storage electrodes extending from the main portion in the same direction as the data line, and the storage electrodes overlap different regions of the data line.

19 Claims, 8 Drawing Sheets

LIQUID CRYSTAL DISPLAY WITH REDUCED PARASITIC CAPACITANCE VARIATION

CROSS-REFERENCE TO RELATED APPLICATION

This application claims priority to and the benefit of Korean Patent Application No. 10-2010-0127014 filed in the Korean Intellectual Property Office on Dec. 13, 2010, the entire content of which is incorporated herein by reference.

BACKGROUND OF THE INVENTION (a) Field of the Invention

The present invention relates to a liquid crystal display.

(b) Description of the Related Art

Liquid crystal displays are one of the more widely used types of flat panel displays today. The liquid crystal display includes two display panels having electrodes formed therein and a liquid crystal layer inserted between the display panels. The liquid crystal layer controls the amount of light that is transmitted in response to a voltage that is applied to the electrodes, which changes the orientation of the liquid crystal molecules.

A liquid crystal display has a color filter to display an image with a variety of colors, and uses a thin film transistor as a switching element to independently drive the individual pixels. The thin film transistor is connected to a gate line transmitting a scanning signal, a data line transmitting an image signal, and a pixel electrode. The scanning signal and the data signal are transmitted through the gate line, the data line and the like, and the thin film transistor controls the data signal, transmitted to the pixel electrode, according to the scanning signal.

Meanwhile, the display panels are provided with various types of wiring such as thin film transistors, gate lines, storage electrode lines, data lines and the like. If the wirings arrangement deviates from the planned layout in the process, the parasitic capacitance of the data line may vary, causing a distortion in the image that is displayed in the liquid crystal display.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a liquid crystal display having advantages of minimizing variations in the parasitic capacitance of a data line.

An exemplary embodiment of the present invention provides a liquid crystal display including: a substrate, a gate line disposed on the substrate, a storage electrode line disposed on the substrate and having a main portion that extends substantially parallel with the gate line, a data line crossing the gate line and the storage electrode line and including a source electrode, a drain electrode facing the source electrode; and a pixel electrode connected to the drain electrode, wherein the storage electrode line includes a plurality of storage electrodes extending from the main portion in the same direction as the data line. The storage electrodes overlap different regions of the data line.

The storage electrode may include a first storage electrode and a second storage electrode overlapping opposite sides of the data line.

The first storage electrode and the second storage electrode may each have a bent portion that is located at substantially the same distance from the main portion and divides each storage electrode into an upper part and a lower part.

The data line may overlap the lower part of the first storage electrode and the upper part of the second storage electrode.

The shape of the region in which the data line overlaps the lower part of the first storage electrode may match the shape of the region in which the data line overlaps the upper part of the second storage electrode upon being rotated by 180 degrees.

The data line may overlap the lower part of the first storage electrode by about 0.5 μm to 3 μm.

The data line may overlap the upper part of the second storage electrode by about 0.5 μm to 3 μm.

Another exemplary embodiment of the present invention provides a liquid crystal display including: a substrate; a first gate line and a second gate line disposed on the substrate; a storage electrode line disposed on the substrate and disposed between the first gate line and the second gate line; a data line crossing the first gate line, the second gate line and the storage electrode line, and including a first source electrode and a second source electrode; a first drain electrode and a second drain electrode facing the first source electrode and the second source electrode, respectively; and a first pixel electrode and a second pixel electrode connected to the first drain electrode and the second drain electrode, respectively, wherein the storage electrode line includes a main portion and a plurality of storage electrodes extending from the main portion in the same direction as the data line, the storage electrodes overlapping different regions of the data line.

The storage electrode may include first to fourth storage electrodes, and the second storage electrode and the third storage electrode overlap opposite sides of the data line.

The second storage electrode and the third storage electrode may each have a bent portion that is located at substantially the same distance from the main portion and divides each storage electrode into an upper part and a lower part.

The data line may overlap the upper part of the second storage electrode and the lower part of the third storage electrode.

The shape of the region in which the data line overlaps the upper part of the second storage electrode matches the shape of the region in which the data line overlaps the lower part of the third storage electrode upon being rotated by 180 degrees.

The data line may overlap the upper part of the second storage electrode by about 0.5 μm to 3 μm.

The data line may overlap the lower part of the third storage electrode by about 0.5 μm to 3 μm.

The first source electrode and the second source electrode may extend in opposite directions to each other.

The first gate line may include a first gate electrode, the second gate line may include a second gate electrode, and the first gate electrode and the second gate electrode may protrude in opposite directions to each other.

According to exemplary embodiments of the present invention, the data line overlaps the storage electrodes disposed opposite to each other with respect to the data line, and the overlapped structure has a mirror-image symmetrical structure with respect to the data line, thereby minimizing variations in the parasitic capacitance of the data line even when the arrangement between the data line and the storage electrodes is distorted in the process.

DETAILED DESCRIPTION OF THE EMBODIMENTS

Figure 1:
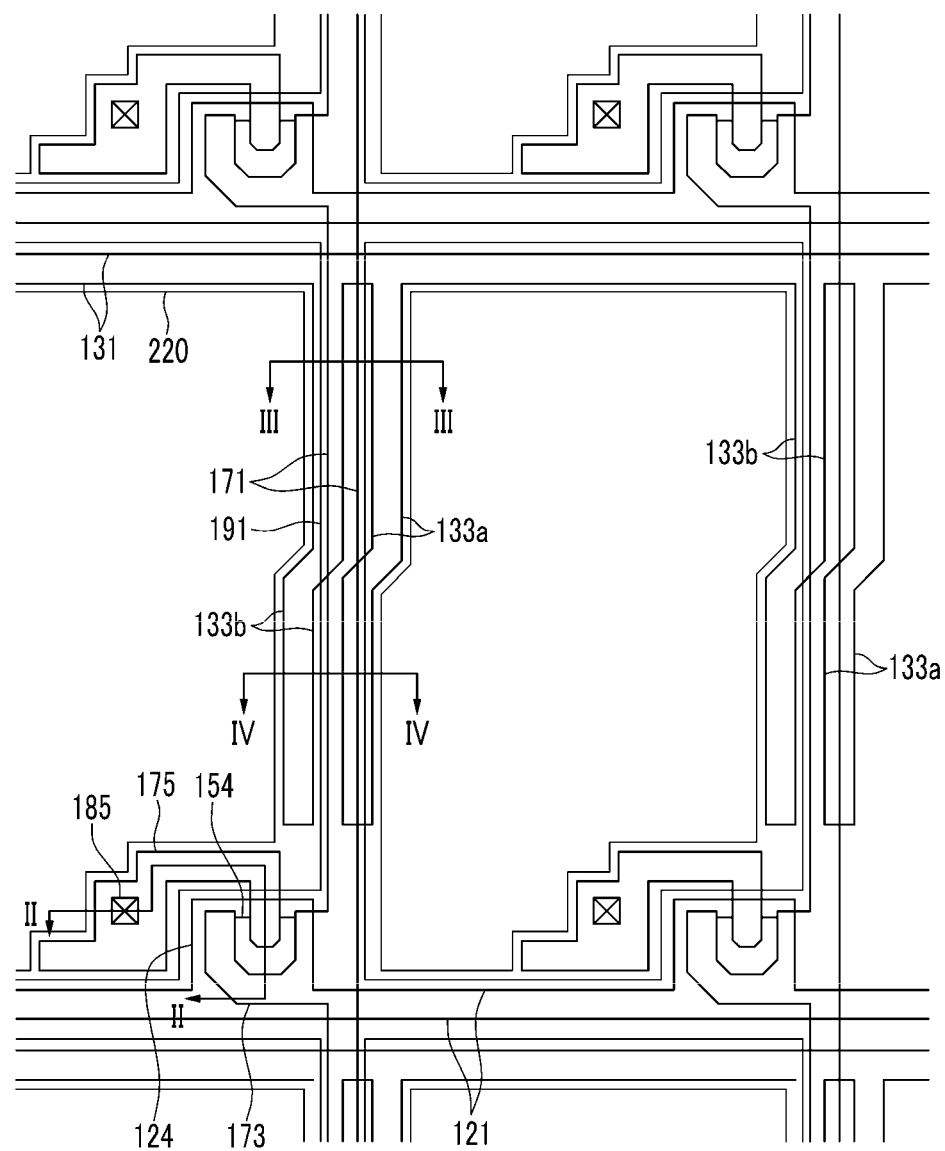
FIG. 1 is a layout view illustrating a liquid crystal display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 2:
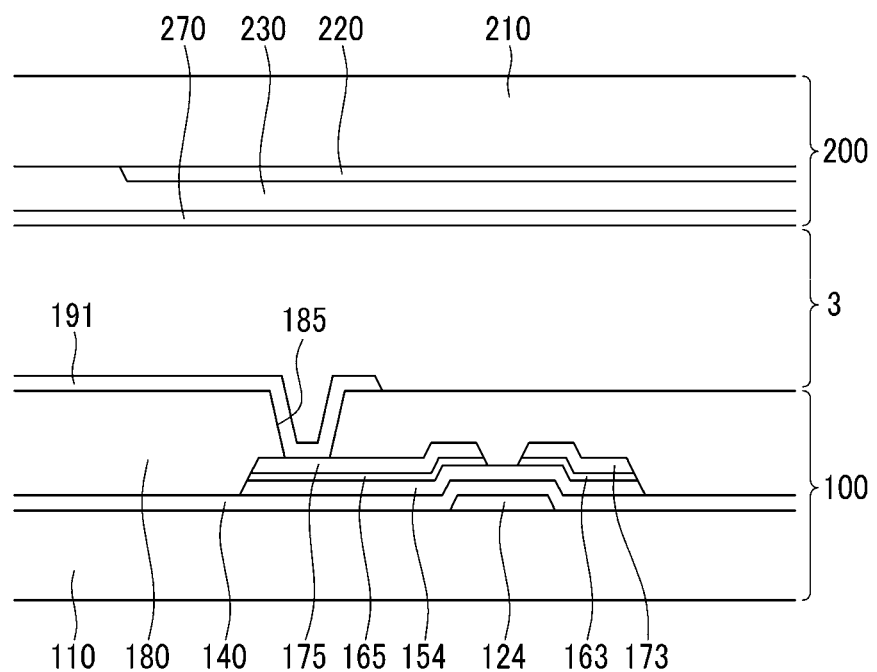
FIG. 2 is a cross-sectional view taken along line II-II of FIG. 1.
Figure 3:
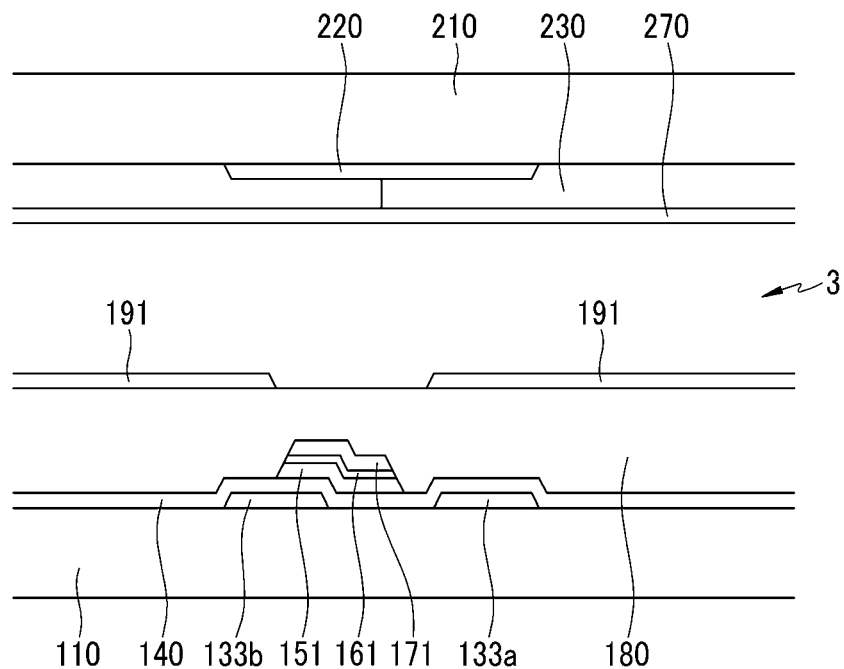
FIG. 3 is a cross-sectional view taken along line III-III of FIG. 1.
Figure 4:
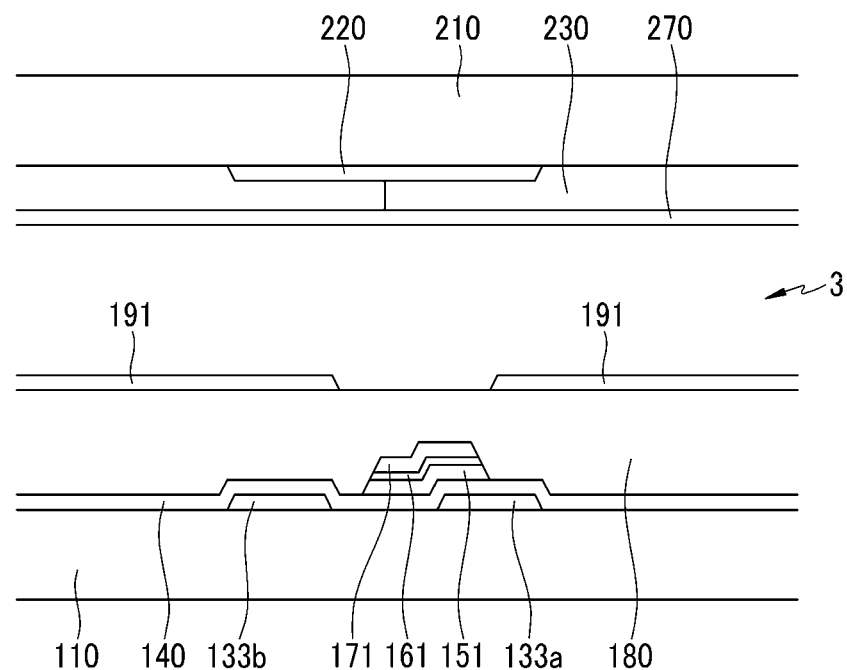
FIG. 4 is a cross-sectional view taken along line IV-IV of FIG. 1.

FIG. 1 is a layout view illustrating a liquid crystal display according to an exemplary embodiment of the present invention, FIG. 2 is a cross-sectional view taken along line II-II of FIG. 1, FIG. 3 is a cross-sectional view taken along line III-III of FIG. 1, and FIG. 4 is a cross-sectional view taken along line IV-IV of FIG. 1.

Referring to FIG. 1 to FIG. 4, the liquid crystal display according to the exemplary embodiment of the present exemplary embodiment includes a thin film transistor array panel 100, a common electrode panel 200 facing the thin film transistor array panel 100, and a liquid crystal layer 3 between the two display panels 100 and 200.

First, the thin film transistor array panel 100 will be described.

A plurality of gate lines 121 including a gate electrode 124 and a plurality of storage electrode lines 131 are formed on a first insulating substrate 110 made of an insulating material such as glass or plastic. The gate line 121 and the storage electrode line 131 may be formed of the same material.

The gate line 121 transmits a gate signal and extends mainly in a horizontal direction with respect to FIG. 1. The storage electrode line 131 is supplied with a predetermined voltage and has a main portion that extends mainly in a horizontal direction.

The storage electrode line 131 includes a first storage electrode 133a and a second storage electrode 133b extending from the main portion of the storage electrode line 131.

The first storage electrode 133a and the second storage electrode 133b are each bent twice to form a bent section and partly overlap a data line 171.

A gate insulating layer 140, made of silicon nitride (SiNx) or silicon oxide (SiOx), is formed on the gate line 121 and the storage electrode line 131.

A semiconductor 151 of hydrogenated amorphous silicon, polysilicon or the like is formed on the gate insulating layer 140. The semiconductor 151 extends in a vertical direction (with respect to FIG. 1) and includes a protrusion portion 154 extending toward the gate electrode 124.

Ohmic contact stripes and islands 161 and 165 are formed on the semiconductor 151. The ohmic contact stripes and islands 161 and 165 may be formed of a silicide or a material such as n+ hydrogenated amorphous silicon doped with a high concentration of n-type impurities, such as phosphor. The ohmic contact stripe 161 has a protruding portion 163, and the protruding portion 163 and the ohmic contact island 165 are disposed as a pair on the protrusion portion 154 of the semiconductor 151.

The data line 171 and a drain electrode 175 are formed on the gate insulating layer 140 and the ohmic contact stripes and islands 161 and 165. The data line 171 and the drain electrode 175 may be formed of the same material.

The data line 171 transmits a data signal, extends in a vertical direction to cross the gate line 121 and the storage electrode line 131, and includes a source electrode 173 extending toward the gate electrode 124.

The drain electrode 175 is separated from the data line 171 and faces the source electrode 173 across the gate electrode 124 (see FIG. 2). The drain electrode 175 includes an enlarged portion having a wide area. The protrusion portion 154 of the semiconductor 151 between the drain electrode 175 and the source electrode 173 is exposed.

A single gate electrode 124, a single source electrode 173, and a single drain electrode 175 constitute a single thin film transistor (TFT) together with the protrusion portion 154 of the semiconductor 151, and a channel of the thin film transistor is formed in the protrusion portion 154 of the semiconductor 151 between the source electrode 173 and the drain electrode 175.

A passivation layer 180, made of a silicon nitride, is formed on the data line 171, the drain electrode 175, the exposed protrusion portion 154 of the semiconductor 151, and the exposed gate insulating layer 140.

A contact hole 185, exposing the drain electrode 175, is formed in the passivation layer 180.

A pixel electrode 191, connected to the drain electrode 175 via the contact hole 185, is formed on the passivation layer 180.

Now, the common electrode panel 200 will be described.

A light blocking member 220 is formed on a second insulating substrate 210, made of transparent glass or plastic or the like, in order to prevent light leakage.

A color filter 230 is formed on the second insulating substrate 210 and the light blocking member 220, and a common electrode 270 is formed on the color filter 230. The common electrode 270 is formed of a transparent conductor such as ITO, IZO or the like.

Thereafter, the liquid crystal layer 3 is positioned between the common electrode panel 200 and the thin film transistor array panel 100.

The pixel electrode 191 supplied with a data voltage and the common electrode 270 supplied with a common voltage constitute a liquid crystal capacitor to thereby store the applied voltage even after the thin film transistor is turned off. The liquid crystal capacitor includes the liquid crystal layer 3 as a dielectric.

A plurality of pixels are defined by the intersection of the data line 171 and the gate line 121, and the first storage electrode 133a and the second storage electrode 133b are disposed in each of the pixels.

The second storage electrode 133b overlaps a data line 171 of a first pixel in which the second storage electrode 133b is disposed, and the first storage electrode 133a overlaps a data line 171 of a neighboring second pixel. In other words, the second storage electrode 133b of the first pixel and the first storage electrode 133a of a neighboring second pixel overlap the data line 171 of the first pixel. The two storage electrodes 133b, 133a may overlap opposite sides of the data line 171. For example, in the embodiment of FIG. 1, the second storage electrode 133b of the first pixel overlaps a left region of the data line 171, and the first storage electrode 133a of the second pixel overlaps the right region of the same data line 171. The left region and the right region are mutually exclusive regions of the data line 171.

FIG. 3 is a cross-sectional view of the upper part of the first storage electrode 133a and the second storage electrode 133b, and FIG. 4 is a cross-sectional view of the lower part of the first storage electrode 133a and the second storage electrode 133b.

The first storage electrode 133a and the second storage electrode 133b are each divided into an upper part and a lower part by a bent portion at the boundary between the upper and lower parts. The data line 171 of the first pixel overlaps (i.e., overlies) the upper part of the second storage electrode 133b of the first pixel and the lower part of the first storage electrode 133a of the second pixel next to the first pixel. The data line 171 of the first pixel overlaps the upper part of the second storage electrode 133b of the first pixel by about 0.5 µm to 3 µm, and overlaps the lower part of the first storage electrode 133a of the second pixel by about 0.5 µm to 3 µm.

The shape of the region in which the data line 171 of the first pixel overlaps the upper part of the second storage electrode 133b of the first pixel and the shape of the region in which the data line 171 of the first pixel overlaps the lower part of the first storage electrode 133a of the neighboring pixel are related such that a 180-degree rotation of one results in the other.

The above relation of the shape of overlapping regions contributes to minimizing variations in the parasitic capacitance of the data line 171 even when the arrangement of the data line 171, and the first storage electrode 133a and the second storage electrode 133b is distorted during the process.

Hereinafter, a liquid crystal display device according to another exemplary embodiment of the present invention will be described with reference to FIG. 5 to FIG. 7.

Figure 5:
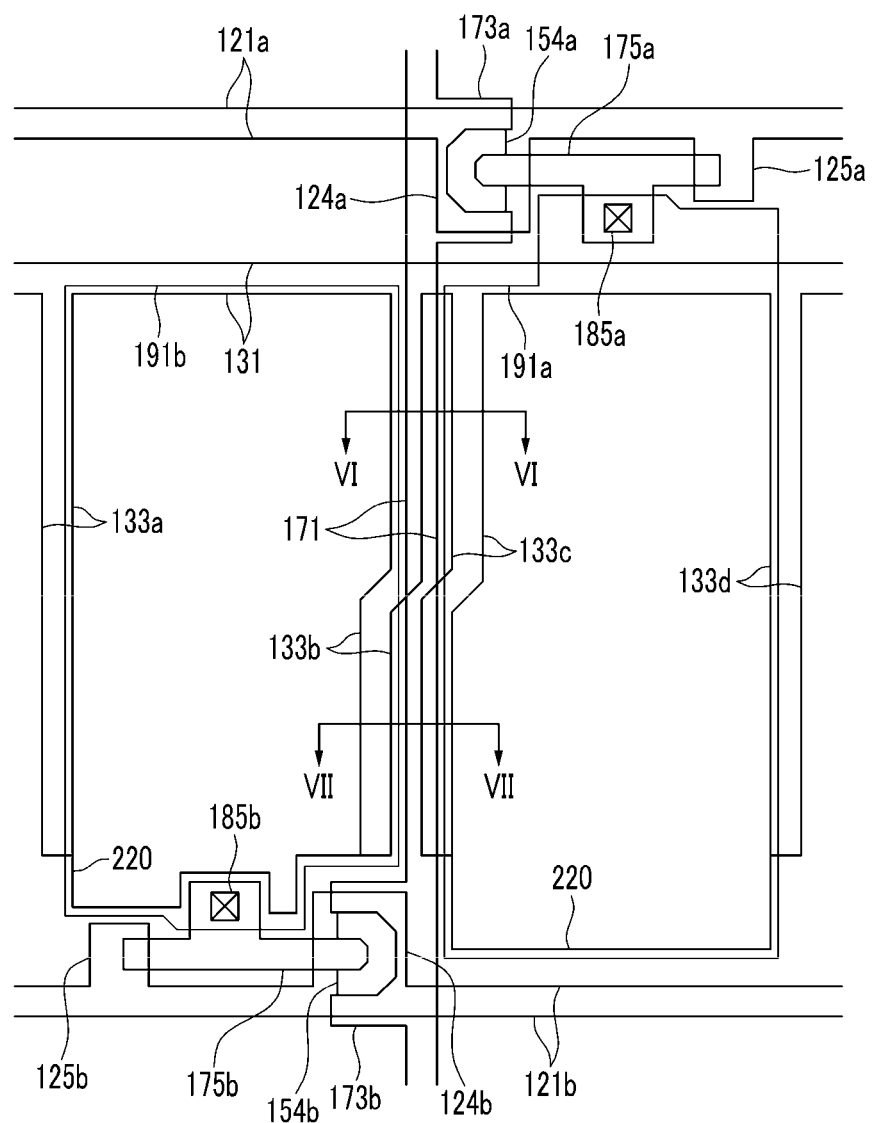
FIG. 5 is a layout view illustrating a liquid crystal display according to another exemplary embodiment of the present invention.
Figure 6:
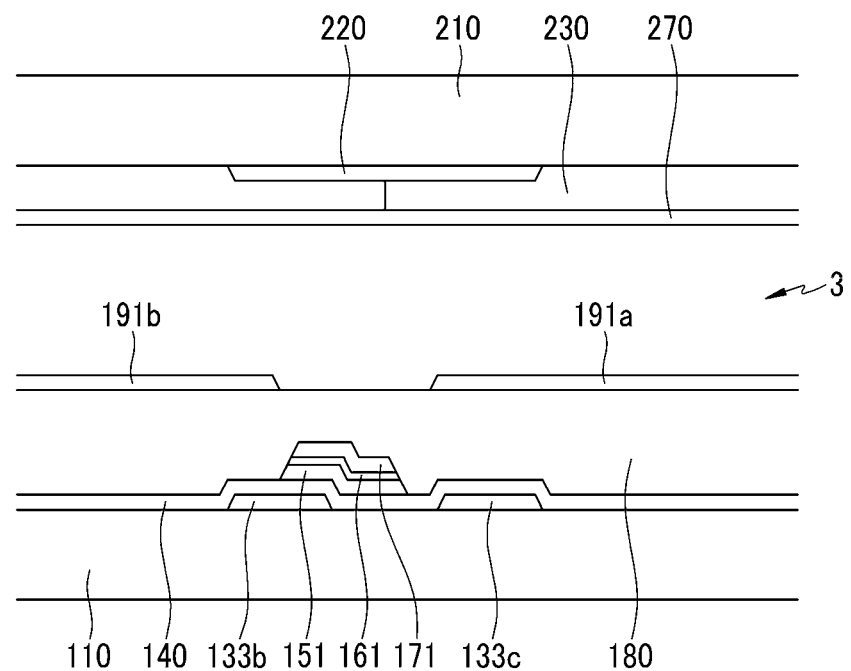
FIG. 6 is a cross-sectional view taken along line VI-VI of the liquid crystal display of FIG. 5.
Figure 7:
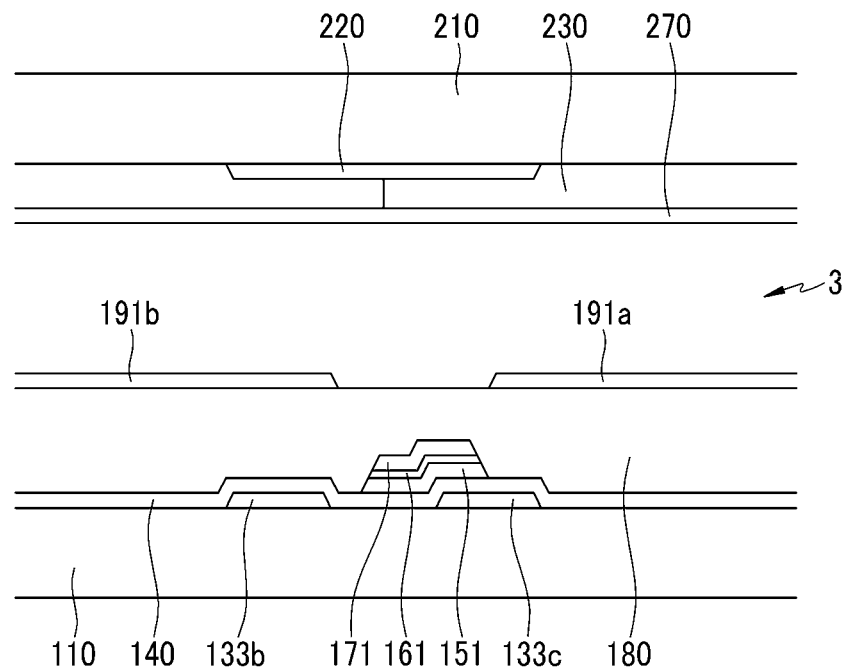
FIG. 7 is a cross-sectional view taken along line VII-VII of the liquid crystal display of FIG. 5.

FIG. 5 is a layout view illustrating a liquid crystal display according to another exemplary embodiment of the present invention, FIG. 6 is a cross-sectional view taken along line VI-VI of FIG. 5, and FIG. 7 is a cross-sectional view taken along line VII-VII of FIG. 5.

Referring to FIG. 5, a first gate line 121a and a second gate line 121b intersect the data line 171 to thereby constitute two pixels.

The first gate line 121a includes a first gate electrode 124a and a first gate protruding portion 125a that protrudes toward the second gate line 121b. The second gate line 121b includes a second gate electrode 124b and a second gate protruding portion 125b that protrudes toward the first gate line 121a.

The data line 171 includes a first source electrode 173a extending toward the first gate electrode 124a and a second source electrode 173b extending toward the second gate electrode 124b. Here, the directions in which the first source electrode 173a and the second source electrode 173b extend are opposite to each other.

A first drain electrode 175a faces the first source electrode 173a, overlaps the first gate electrode 124a and the first gate protruding portion 125a, and widens at one end to form an enlarged portion. A second drain electrode 175b faces the second source electrode 173b, overlaps the second gate electrode 124b and the second gate protruding portion 125b, and widens at one end to form an enlarged portion.

Protrusion portions 154a and 154b of a semiconductor are positioned between the first source electrode 173a and the first drain electrode 175a and between the second source electrode 173b and the second drain electrode 175b, respectively.

The enlarged portions of the first drain electrode 175a and the second drain electrode 175b have a first contact hole 185a and a second contact hole 185b, respectively. The first pixel electrode 191a is connected to the first drain electrode 175a through the first contact hole 185a, and the second pixel electrode 191a is connected to the second drain electrode 175b through the second contact hole 185b.

The storage electrode line 131 is disposed between the first gate line 121a and the second gate line 121b, and extends parallel to the first gate line 121a and the second gate line 121b.

The storage electrode line 131 includes first to fourth storage electrodes 133a, 133b, 133c, and 133d extending in a direction that is substantially perpendicular to the main section of the storage electrode line 131 (in a downward direction in reference to FIG. 5). The first storage electrode 133a and the second storage electrode 133b are disposed on the second pixel 191b, and the third storage electrode 133c and the fourth storage electrode 133d are disposed on the first pixel electrode 191a.

The first storage electrode 133a and the fourth storage electrode 133d extend parallel to the data line 171 and are substantially straight, whereas the second storage electrode 133b and the third storage electrode 133c are bent while extending in the same general direction as the first and fourth storage electrodes 133a, 133d. The second storage electrode 133b and the third storage electrode 133c partly overlap the data line 171. The second storage electrode 133b and the third storage electrode 133c are each divided into upper and lower parts and bent at the boundary between the upper and lower parts.

Referring to FIG. 6 and FIG. 7, the second storage electrode 133b and the third storage electrode 133c are formed on the first insulating substrate 110, and a gate insulating layer 140 is formed thereon.

The semiconductor 151, the ohmic contact stripe 161 and the data line 171 are sequentially formed on the gate insulating layer 140, the passivation layer 180 is formed on the data line 171 and the gate insulating layer 140, and a first pixel electrode 191a and a second pixel electrode 191b are formed on the passivation layer 180.

The light blocking member 220 and the color filter 230 are formed on the second insulating substrate 210, the common electrode 270 is formed on the color filter 230, and the liquid crystal layer 3 is positioned between the common electrode 270 and the first pixel electrode 191a and the second pixel electrode 191b.

FIG. 6 is a cross-sectional view of the upper part of the second storage electrode 133b and the third storage electrode 133c, and FIG. 7 is a cross-sectional view of the lower part of the second storage electrode 133b and the third storage electrode 133c.

The data line 171 overlaps the upper part of the second storage electrode 133b and the lower part of the third storage electrode 133c (see FIG. 5). The data line 171 overlaps the upper part of the second storage electrode 133b by a width of 0.5 μm to 3 μm, while overlapping the lower part of the third storage electrode 133c by a width of 0.5 μm to 3 μm.

A region in which the data line 171 overlaps the upper part of the second storage electrode 133b and a region in which the data line 171 overlaps the lower part of the third storage electrode 133c are shaped such that a 180-degree rotation of one region would result in the shape of the other region.

The above relation between the shape of the upper overlapping region and the lower overlapping region contributes to minimizing variations in the parasitic capacitance of the data line 171 even when the data line 171, and the second storage electrode 133b and the third storage electrode 133c are distorted in the arrangement thereof during the process.

Figure 8:
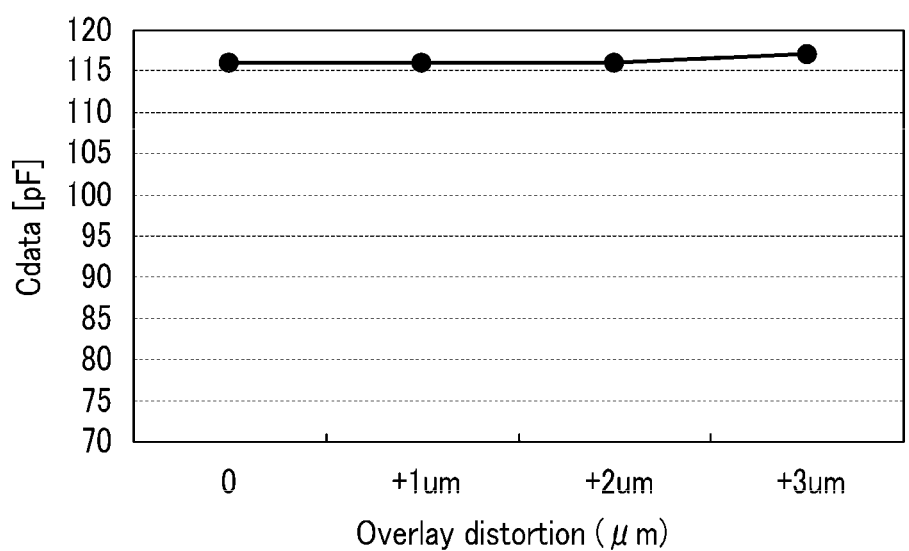
FIG. 8 is a graph showing the variation in the parasitic capacitance of a data line when the arrangement of the data line and a storage electrode are distorted in a liquid crystal display according to an exemplary embodiment of the present invention.

FIG. 8 is a graph showing the variation in the parasitic capacitance of a data line when the arrangement between a data line and a storage electrode is distorted in a liquid crystal display according to an exemplary embodiment of the present invention.

As shown in FIG. 8, the parasitic capacitances of the data line do not change significantly when the data line and the storage electrode are overlapped by up to 3 μm.

<Description Of Symbols>

| 121, 121a, 121b: Gate line | 131: Storage electrode line |
| 133a, 133b, 133c, 133d: Storage electrode | 171: Data line |

While this invention has been described in connection with what is presently considered to be practical exemplary embodiments, it is to be understood that the invention is not limited to the disclosed embodiments and is intended to cover various modifications and equivalent arrangements included within the spirit and scope of the appended claims.

What is claimed is:

1. A liquid crystal display, comprising:
a substrate;
a gate line disposed on the substrate;
a data line crossing the gate line and including a source electrode;
a storage electrode line disposed on the substrate and having a main portion that extends substantially parallel with the gate line and a plurality of storage electrodes extending from the main portion in a same direction as the data line;
pixel electrodes disposed on either side of the data line,
wherein the storage electrode includes a first storage electrode and a second storage electrode disposed on either side of the data line, the first storage electrode and the second storage electrode being disposed between the data line and respective pixel electrodes,
wherein each of the first storage electrode and the second storage electrode has an upper part, a lower part and a bent portion that is located at substantially a same distance from the main portion , the bent portion divides each of the first storage electrode and the second storage electrode into the upper part and the lower part,
wherein the upper part of the first storage electrode and the lower part of the second storage electrode do not overlap the data line, and
wherein the plurality of storage electrodes are disposed between adjacent pixel electrodes.

2. The liquid crystal display of claim 1, wherein the lower part of the first storage electrode and the upper part of the second storage electrode overlap the data line.

3. The liquid crystal display of claim 2, wherein a shape of a region in which the data line overlaps the lower part of the first storage electrode matches a shape of a region in which the data line overlaps the upper part of the second storage electrode upon being rotated by 180 degrees.

4. The liquid crystal display of claim 3, wherein the data line overlaps the lower part of the first storage electrode by about 0.5 μm to 3 μm.

5. The liquid crystal display of claim 4, wherein the data line overlaps the upper part of the second storage electrode by about 0.5 μm to 3 μm.

6. A liquid crystal display, comprising:
a substrate;
a first gate line and a second gate line disposed on the substrate;
a data line crossing the first gate line and the second gate line and including a first source electrode and a second source electrode;
a storage electrode line disposed on the substrate and having a main portion that extends substantially parallel with the gate line and a plurality of storage electrodes extending from the main portion in a same direction as the data line, the storage electrode line being disposed between the first gate line and the second gate line; and
a first pixel electrode and a second pixel electrode disposed on either side of the data line,
wherein the plurality of storage electrodes includes a first storage electrode and a second storage electrode disposed on either side of the first pixel electrode, and a third storage electrode and a fourth storage electrode disposed on either side of the second pixel electrode,
wherein the data line is disposed between the second storage electrode and the third storage electrode,
wherein each of the second storage electrode and the third storage electrode has an upper part, a lower part and a bent portion that is located at substantially a same distance from the main portion , the bent portion divides each of the first storage electrode and the second storage electrode into the upper part and the lower part, and
wherein the upper part of the third storage electrode and the lower part of the second storage electrode do not overlap the data line.

7. The liquid crystal display of claim 6, wherein the data line overlaps the upper part of the second storage electrode and the lower part of the third storage electrode.

8. The liquid crystal display of claim 7, wherein a shape of a region in which the data line overlaps the upper part of the second storage electrode matches a shape of a region in which the data line overlaps the lower part of the third storage electrode upon being rotated by 180 degrees.

9. The liquid crystal display of claim 8, wherein the data line overlaps the upper part of the second storage electrode by about 0.5 μm to 3 μm.

10. The liquid crystal display of claim 9, wherein the data line overlaps the lower part of the third storage electrode by about 0.5 μm to 3 μm.

11. The liquid crystal display of claim 6, wherein the first source electrode and the second source electrode extend in opposite directions to each other.

12. The liquid crystal display of claim 6, wherein the first gate line includes a first gate electrode,
the second gate line includes a second gate electrode, and the first gate electrode and the second gate electrode protrude in opposite directions to each other.

13. The liquid crystal display of claim 2, wherein a shape of a region in which the data line overlaps the lower part of the first storage electrode matches a shape of a region in which the data line overlaps the upper part of the second storage electrode upon being rotated by 180 degrees.

14. The liquid crystal display of claim 8, wherein the first storage electrode and the fourth storage electrode extend along an edge of the first pixel electrode and the second pixel electrode, respectively, each of the first storage electrode and the fourth storage electrode having no bent portion.

15. The liquid crystal display of claim 14, wherein the first storage electrode overlaps the first pixel electrode and the fourth pixel electrode overlaps the second pixel electrode.

16. The liquid crystal display of claim 7, wherein the first storage electrode and the fourth storage electrode extend along an edge of the first pixel electrode and the second pixel electrode respectively, the first storage electrode and the fourth storage electrode having no bent portion.

17. The liquid crystal display of claim 16, wherein the first storage electrode overlaps the first pixel electrode and the fourth pixel electrode overlaps the second pixel electrode.

18. The liquid crystal display of claim 6, wherein the first storage electrode and the fourth storage electrode extend along an edge of the first pixel electrode and the second pixel electrode respectively, the first storage electrode and the fourth storage electrode having no bent portion.

19. The liquid crystal display of claim 18, wherein the first storage electrode overlaps the first pixel electrode and the fourth pixel electrode overlaps the second pixel electrode.

* * * * *